US012480442B1

(12) United States Patent
Fitterer et al.

(10) Patent No.: US 12,480,442 B1
(45) Date of Patent: Nov. 25, 2025

(54) SYSTEMS AND METHODS FOR CONTROLLING AN EXHAUST SYSTEM

(71) Applicant: Solar Turbines Incorporated, San Diego, CA (US)

(72) Inventors: Zachary Fitterer, San Diego, CA (US); Aditya Gadkari, Maharashtra (IN); James Underwood, Chula Vista, CA (US); Sindhu Penna, Bangalore (IN)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/999,527

(22) Filed: Dec. 23, 2024

(51) Int. Cl.
*F02C 3/30* (2006.01)
*F02C 3/20* (2006.01)
*F02C 7/25* (2006.01)

(52) U.S. Cl.
CPC .................. *F02C 3/20* (2013.01); *F02C 3/30* (2013.01); *F02C 7/25* (2013.01)

(58) Field of Classification Search
CPC ...... F02C 3/30; F02C 7/25; F02C 3/20; F01D 25/30; F01D 25/305
See application file for complete search history.

(56) References Cited

U.S. PATENT DOCUMENTS

| | | | | |
|---|---|---|---|---|
| 3,998,047 A | * | 12/1976 | Walker | F01D 25/30 60/39.23 |
| 5,303,684 A | | 4/1994 | Brown et al. | |
| 5,581,995 A | * | 12/1996 | Lucenko | F01D 17/02 60/779 |
| 5,961,314 A | * | 10/1999 | Myhre | F23D 14/725 250/206 |
| 7,281,382 B2 | | 10/2007 | Plimpton et al. | |
| 12,140,088 B1 | * | 11/2024 | Perera | F04D 27/001 |
| 2009/0063003 A1 | * | 3/2009 | Meadows | F02C 9/28 415/118 |
| 2011/0036066 A1 | * | 2/2011 | Zhang | F01D 25/305 60/39.5 |
| 2014/0196464 A1 | * | 7/2014 | Biyani | F02C 7/18 60/722 |
| 2017/0030228 A1 | * | 2/2017 | Jordan, Jr. | F02C 7/18 |
| 2017/0356349 A1 | * | 12/2017 | Jiang | F01D 21/003 |

FOREIGN PATENT DOCUMENTS

| | | |
|---|---|---|
| EP | 4075065 A1 | 10/2022 |
| JP | 4119575 B2 * | 7/2008 |
| WO | 2014025446 A1 | 2/2014 |
| WO | WO-2022181370 A1 * | 9/2022 |

OTHER PUBLICATIONS

English translation of WO 2022181370 (Year: 2022).*
English translation of JP 4119575 (Year: 2008).*

* cited by examiner

Primary Examiner — Thomas P Burke

(57) ABSTRACT

A method of diluting one or more exhaust gases of a gas turbine engine system includes a number of steps. The gas turbine engine system includes a compressor, a combustor, and a turbine. The method includes determining if fuel is flowing to the combustor of the gas turbine engine system, detecting a flameout condition within the combustor, and releasing a dilution gas from one or more storage containers downstream of the turbine as a function of the detected the flameout condition.

20 Claims, 3 Drawing Sheets

SYSTEMS AND METHODS FOR CONTROLLING AN EXHAUST SYSTEM

TECHNICAL FIELD

The present disclosure relates generally to systems and methods for controlling an exhaust system, and more particularly, to systems and methods for controlling an exhaust system to dilute the exhaust of an engine, for example, a gas turbine engine.

BACKGROUND

When operating on alternate fuels, such as hydrogen, engines have potential to have an ignitable or detonatable exhaust mixture. Specifically, in the event of a late light off or flame out, the engines can have the ignitable or detonatable exhaust mixture due to unburnt fuel entering the exhaust in a concentration that is above the lower flammability or lower detonation limit. If an ignition source is present in the exhaust system or if the fuel resides longer in the exhaust system than the auto ignition delay time, then an ignition, deflagration, or detonation can occur, with the likelihood depending on the fuel to air ratio. The ignition, deflagration, or detonation can negatively affect the engine.

International Patent Application Publication No. WO2014/025446A1, published on Feb. 13, 2024 ("the '446 publication"), describes a contained flare system for post loss-of-coolant accident mitigation.

The systems and methods of the present disclosure may solve one or more of the problems set forth above and/or other problems in the art.

SUMMARY

In one aspect, a method of diluting one or more exhaust gases of a gas turbine engine system may include a number of steps. The gas turbine engine system may include a compressor, a combustor, and a turbine. The method may include determining if fuel is flowing to the combustor of the gas turbine engine system, detecting a flameout condition within the combustor, and releasing a dilution gas from one or more storage containers downstream of the turbine as a function of the detected the flameout condition.

In another aspect, a method of deploying a dilution gas into an exhaust of a gas turbine engine system may include a number of steps. The gas turbine engine system may include a compressor, a combustor, and a turbine. The method may include determining if fuel is flowing to the combustor of the gas turbine engine system, detecting a flameout condition within the combustor, and releasing a dilution gas from one or more storage containers downstream of the turbine a predetermined amount of time after detecting the flameout condition.

In yet another aspect, a gas turbine engine system for combusting fuel may include a compressor, a combustor downstream of the compressor for igniting the fuel and producing a flame, a turbine downstream of the combustor, an exhaust path downstream of the turbine, a sensor for detecting whether the flame within the combustor has been extinguished, a container of an inert gas, and a controller. The container may be coupled to the exhaust path via a release valve. The controller may be in communication with the sensor and the release valve. The controller may be configured to open the release valve after detecting that the flame within the combustor has been extinguished.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

The devices, systems, and methods of the present disclosure provide for the dilution of exhaust gases by displacing oxygen to decrease the likelihood of ignition or detonation of one or more exhaust gases.

Figure 1:
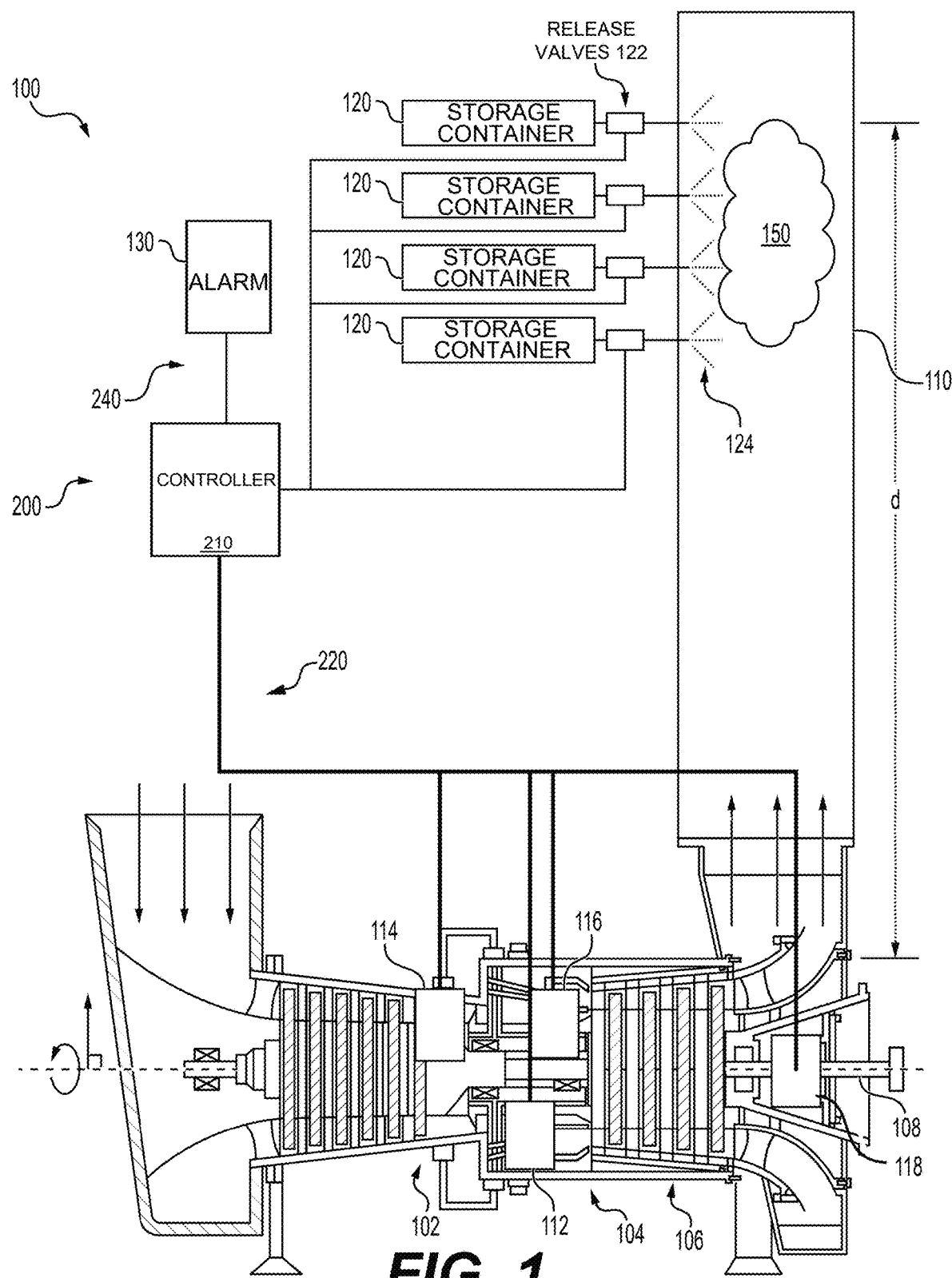
FIG. 1 illustrates a gas turbine generator system, according to aspects of the disclosure.
Figure 2:
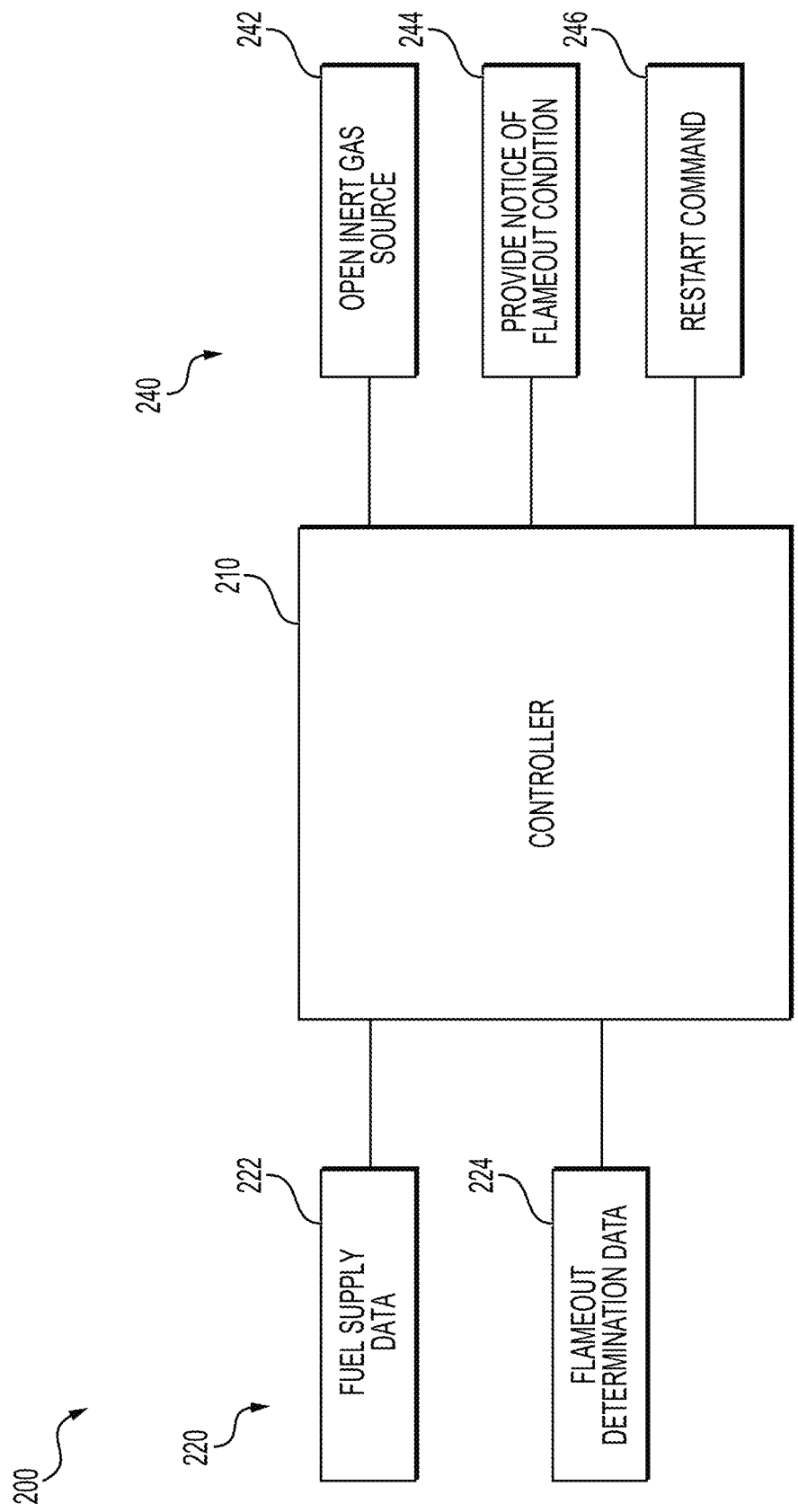
FIG. 2 is a schematic illustration of a control system of the gas turbine generator system of FIG. 1, according to example aspects of the disclosure.

FIG. 1 illustrates a gas turbine engine system 100, according to aspects of this disclosure. The gas turbine engine system 100 may include a compressor 102, a combustor 104 downstream of the compressor 102, a turbine 106 downstream of the combustor 104, an output shaft 108 mechanically connected to the turbine 106, and an enclosed exhaust path 110 downstream of the turbine 106. One or more storage containers 120 containing inert gas 124 (e.g., nitrogen) may be distributed along, and fluidly connected to, the exhaust path 110. The gas turbine engine system 100 may further include a control system 200 having a controller 210 with one or more inputs 220 and one or more outputs 240 (FIG. 2). The inputs 220 may include data received from sensors within the gas turbine engine system 100, for example a fuel sensor 112 (e.g., a sensor to detect or measure a presence, concentration, etc. of a fuel, such as, for example, hydrogen), a pressure sensor 114, a flame sensor 116, or a tachometer 118. As shown in FIG. 2, the outputs 240 may include a command to open the storage containers 120, a command to provide an alert of a flameout condition, e.g. via one or more alarms 130, or a command to restart the turbine engine system 100.

The combustor 104 may receive one or more fuels therein, as well as compressed air from the compressor 102. The one or more fuels may be received within the combustor 104 at different rates and at different times, such that the proportion of any one fuel within the combustor 104 is variable. The one or more fuels and the compressed air may be ignited to produce a flame within the combustor 104.

Various types of fuels may be received within the combustor 104 as a fuel source. The fuel(s) may be gaseous or liquid. Where a plurality of fuels is used, a first fuel may be liquid, and a second fuel may be gaseous. Alternatively, the plurality of fuels may be entirely liquid or entirely gaseous. Gaseous fuels may include hydrogen. Other gaseous fuels that may be received within the combustor include natural gas, landfill gas, bio-gas, syngas, and any other type of suitable gaseous fuel. Liquid fuels that may be received within the combustor include diesel, kerosene, gasoline, or any other type of suitable liquid fuel.

As noted above, the storage containers 120 include an inert gas, such as, for example, nitrogen. However, it is understood that other inert gases may be used in storage containers 120. The storage containers 120 be positioned along the flow of the exhaust produced by the gas turbine engine system 100, such that each successive storage container 120 is downstream of the previous storage container 120. In other examples, the one or more storage containers 120 may be positioned at the same location along the exhaust path 110. In further examples, multiple sets of storage containers 120 may be used, with each set having multiple containers storage containers 120 at a position along a length of the exhaust path 110, and each successive set being downstream of the previous set. The position of each storage container 120 along the exhaust path 110 may be determined for a particular gas turbine engine system 100 using computational fluid dynamics ("CFD"). For example, the CFD may determine the optimal dispersion or dilution of an inert gas 124 from containers 120 within the exhaust path 110 in a worst case scenario of hydrogen buildup 150 (explained further below) for a particular gas turbine engine system 100. For example, as show in FIG. 1, CFD may be used to determine that the optimal position for the storage container 120 further upstream should be a distance d away from an outlet of the turbine 106, with the remaining storage containers 120 positioned successively downstream and spaced apart by a particular spacing. In the example shown in FIG. 1, the spacing a is constant between each storage container 120. In other examples, the spacing a between each storage container 120 may be varied based on CFD to obtain optimal dispersion of inert gas 124 for a worst case scenario of hydrogen buildup 150.

As shown in FIG. 1, the gas turbine engine system 100 may include four storage containers 120 positioned along the exhaust path 110. In other embodiments, the gas turbine engine system 100 may have one storage container 120, two storage containers 120, three storage containers 120, five storage containers 120, or more than five storage containers 120, for example, ten, 20, 30, 40, 50, 60, 70, 80, 90, 100, etc. storage containers 120. In some aspects, the number of storage containers 120 may depend on one or more of a size of the gas turbine engine system 100, a size of each of the storage containers 120, the type of fuel in operation, etc. In some examples, approximately 15 to approximately 25 storage containers 120, for example, approximately 18 storage containers 120 (e.g., 18 nitrogen storage containers with approximately 3466 cubic inches of capacity) may be sufficient to help dilute the one or more exhaust gases. In other examples, when gas turbine engine system 100 has a higher capacity power output, a larger number of storage containers 120 (e.g., approximately 40 to 50 storage containers 120) may be used to help dilute the one or more exhaust gases, for example, when the one or more exhaust gases have a higher exhaust gas flow rate.

A controllable release valve 122 may be connected to each storage container 120 such that the release valve 122 prevents or allows the release of the inert gas 124 from the storage containers 120 into the exhaust path 110. Each release valve 122 may be connected to the controller 210 (e.g., via a wired connection or wireless connection), such that the controller 210 may signal to open or close each of the one or more release valves 122. For example, each release valve 122 may be a solenoid valve. Additionally, release valves 122 may be positioned along (e.g., spaced apart) the length of exhaust path 110.

The pressure sensor 114 may be positioned within the compressor 102. The fuel sensor 112 may be positioned within the combustor 104 at or near a fuel inlet (not shown). Alternatively, or additionally, the fuel sensor 112 may be positioned along or at the terminus of a hydrogen fuel line (not shown). The flame sensor 116 may be positioned within the combustor 104, downstream of the fuel inlet. The tachometer 118 may be position on and/or along the output shaft 108. The pressure sensor 114, the fuel sensor 112, the flame sensor 116, and the tachometer 118 may be in communication with the controller 210, for example, via one or more wired or wireless connections.

Furthermore, as noted above, the controller 210 may be in communication with one or more alarms 130, for example, via one or more wired or wireless connections. As discussed below, the one or more alarms 130 may be configured to indicate a detection of a flameout condition, for example, via one or more of an audible alarm, a visual alarm, a tactile alarm, etc. The one or more alarms 130 may be positioned on, adjacent to, or in proximity to gas turbine engine system 100.

FIG. 2 is a schematic illustration of control system 200 of the gas turbine engine system 100 of FIG. 1, according to some examples. As mentioned above, control system 200 includes controller 210, which receives one or more inputs 220 and emits one or more outputs 240. The controller 210 may be coupled to or include one or more memory units, which may contain instructions for the controller 210 to initiate one or more steps or procedures. The controller 210 may be a separate controller on the gas turbine engine system 100, or may be integrated into a central controller (e.g., a main power or operation controller, etc.). Alternatively, the controller 210 may be integrated into one or more systems or modules on the gas turbine engine system 100 and/or an associated machine. In one aspect, the controller may control one or more electrical switches or valves in order to control one or more hydraulic cylinders or electrical elements, for example, to open or close one or more release valves 122.

The controller 210 may embody a single microprocessor or multiple microprocessors that may include systems for performing any of the operations mentioned herein. For example, the controller may include a memory (as stated above), a secondary storage device, a processor, such as a central processing unit, or any other systems for accomplishing a task consistent with the present disclosure. The memory or secondary storage device associated with the controller 210 may be non-transitory computer-readable media that stores data and/or software routines that may assist the controller 210 in performing its functions, such as the functions of method or process discussed below with reference to FIGS. 2 and 3. Further, the memory or secondary storage device associated with the controller 210 may also store data received from the various inputs or sensors associated with the gas turbine engine system 100. Numerous commercially available microprocessors can be configured to perform the functions of the controller 210. It should be appreciated that the controller 210 could readily embody a general machine controller capable of controlling numerous other machine functions. Various other known circuits may be associated with the controller 210, including signal-conditioning circuitry, communication circuitry, hydraulic or other actuation circuitry, and other appropriate circuitry. As discussed herein, the controller 210 may receive various inputs (e.g., from various sensors), and based on the various inputs, the controller 210 may signal initiation of one or more precautionary steps or procedure and/or one or more indications or warnings (e.g., activate the alarm 130).

The inputs 220 to the controller 210 may include one or more of fuel supply data 222 and flameout determination data 224. The fuel supply data 222 may be obtained from the fuel sensor 112 or may be obtained via user input to the controller 210 (e.g., via a user interface). The fuel supply data 222 may include data or information concerning one or more of: whether a fuel (e.g., hydrogen) is flowing into the combustor 104, how much fuel is flowing into the combustor 104, or the proportion of fuel to air and other fuels within the combustor 104. For example, the fuel supply data 222 may include an indication that fuel (e.g., hydrogen) is flowing into the combustor 104, that the fuel is flowing at a particular rate (e.g., approximately 0.3 kg/s to approximately 1.5 kg/s, for example, approximately 0.5 kg/s to approximately 1.0 kg/s), that fuel is 50% of the total fluid within the combustor 104, etc. As mentioned above, the fuel may, in some instances, be hydrogen, in which case the flow rate may be a rate of flow (e.g., in kg/s) of hydrogen. Nevertheless, although we refer to hydrogen as an example fuel in several instances, it is noted that the fuel may instead include one or more fuels other than hydrogen. Furthermore, it is noted that the particular flow rate for the fuel supply data 222 may depend on a type or size of the gas turbine engine system 100, for example, with a larger or more powerful gas turbine engine system having a higher particular flow rate. The flameout determination data 224 may include data or information indicative of one or more of whether a flame is present within the combustor 104 or if the flame has been extinguished (e.g., a flameout condition). In some examples, the flameout determination data 224 may include data or information from one or more of the pressure sensor 114, the flame sensor 116, the tachometer 118, as well as other sensors or inputs, such as user inputs.

A flameout condition may be determined based on data or information from pressure sensor 114, for example, data or information that indicates low pressure within the turbine. When a flameout occurs, the one or more fuels within the combustor 104 are no longer ignited, resulting in a reduction of one or more of pressure, temperature, or velocity of the exhaust flowing into the turbine 106. The loss of pressure in the exhaust results in less kinetic energy being transferred to the turbine 106. The loss of compression results in reduced pressure within the compressor 102.

A flameout condition may be determined based on data or information from tachometer 118 that indicates a load swing or load change. In some examples, the output shaft 108 may be connected to an electrical generator, which may in turn be connected to a grid. When the exhaust path 110 is running nominally (e.g., with an active flame within the combustor 104), the exhaust from the combustor 104 rotates the turbine 106, which in turn rotates the output shaft 108 such that the generator provides power to the grid. If the rotation of the output shaft 108 is unable to generate sufficient electrical current, other electrical sources (e.g., the grid) may begin to power the generator as if it was a motor. In these aspects, the generator and the output shaft 108 may rotate at a same or similar rate, but will experience reverse current or reverse power under the flameout condition, as the generator draws power from the grid.

A flameout condition may also be determined based on data or information from flame sensor 116. For example, flame sensor 116 may directly indicate the presence or absence of a flame within the combustor 104.

Based on the various inputs 220, the controller 210 may emit one or more outputs 240. For example, if the controller 210 determines that a flameout condition has occurred, controller 210 may emit a first output 242, which may include a signal to open or supply an inert gas (nitrogen source) from storage containers 120 into exhaust path 110. As mentioned, the controller 210 may be in communication with one or more release valves 122. The release valves 122 may control the flow of the nitrogen from respective storage containers 120 into exhaust path 110. Thus, the nitrogen in the storage container(s) 120 provide a dilution gas into the exhaust path 110. In these aspects, the first output 242 may include a signal to open one or more of the release valves 122, such that an inert gas (e.g., nitrogen) flows from one or more of the storage containers 120 into the exhaust path 110. In some aspects, the first output 242 may signal one or more of the release valves 122 to opening at a predetermined time delay after detecting the flameout condition.

Additionally or alternatively, if the controller 210 determines that a flameout condition has occurred, the controller 210 may emit a second output 244, which may include a signal to provide notice of a flameout condition. As mentioned, the controller 210 may be in communication with one or more user interfaces, such as one or more alarms 130, and the second output 244 may include a signal to provide notice of the flameout condition to the user interface. The user interface may be configured to provide audible, visual, tactile, etc. alerts.

Furthermore, in some aspects, if the controller 210 determines that a flameout condition has occurred, the controller 210 may emit a third output 246, which may include a restart command. For example, the third output 246 may be a command to restart the gas turbine engine system 100 after the detection of the flameout condition. In some aspects, the third output 246 may include a command to restart the gas turbine engine system 100 after a predetermined time delay after detecting the flameout condition.

Figure 3:
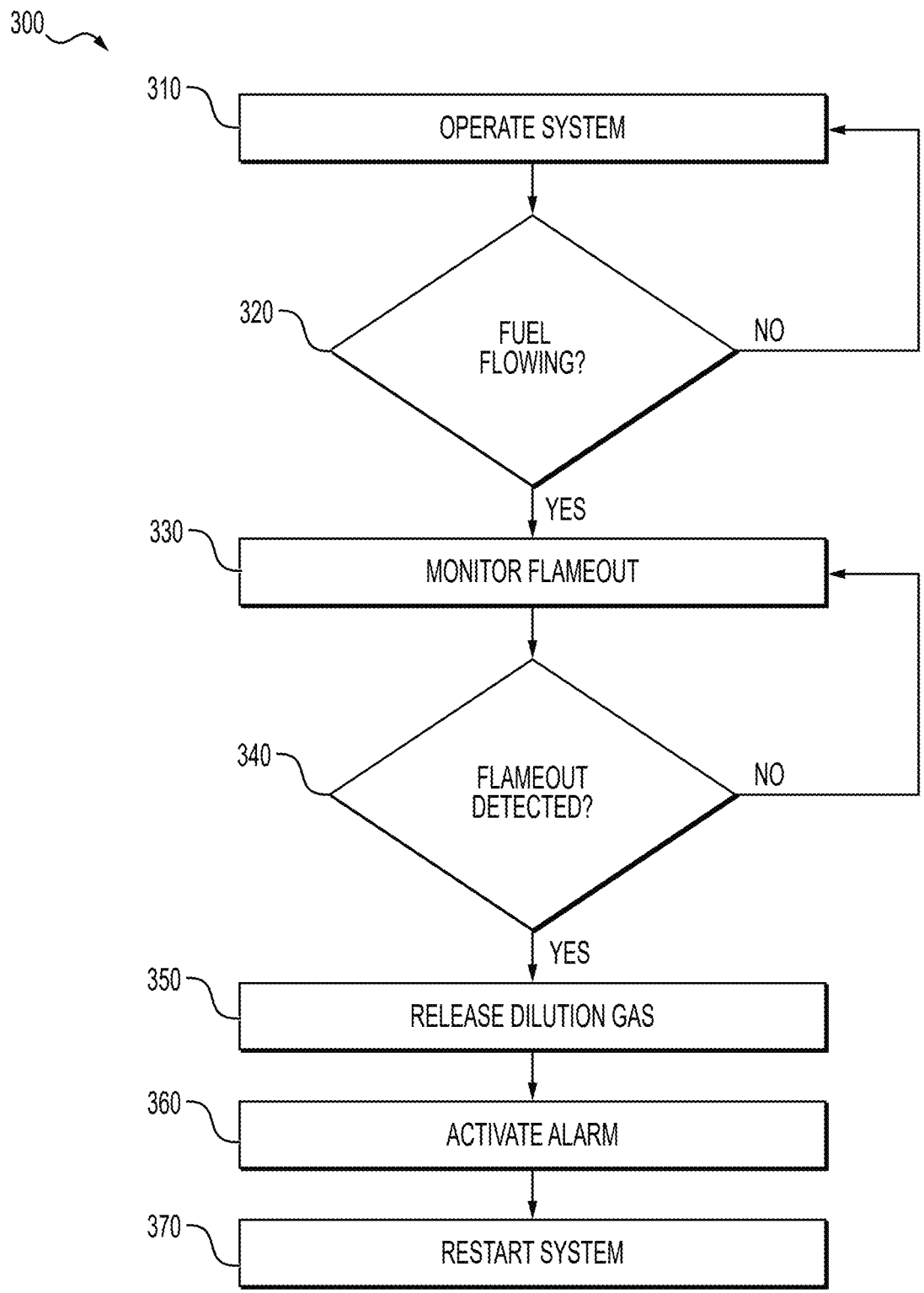
FIG. 3 provides a flowchart depicting an exemplary method for diluting hydrogen in the exhaust of a gas turbine generator, according to example aspects of the disclosure.

FIG. 3 provides a flowchart depicting an exemplary method 300 for diluting the exhaust of a gas turbine engine system 100, according to example aspects of the disclosure. For example, as discussed below, method 300 may include deploying a dilution gas (e.g., an inert gas, such as, for example, nitrogen) into the exhaust of a gas turbine engine generator system 100, which may help to reduce or dilute the concentration of one or more fluids or gases (e.g., hydrogen, oxygen, etc.) to help prevent or reduce the likelihood of an ignition, a deflagration, a detonation, etc. in the exhaust path 110. For example, reducing, limiting, or otherwise diluting a concentration of oxygen (e.g., $O_2$) when a flameout condition occurs may help to reduce the likelihood of an ignition, a deflagration, a detonation, etc. in the exhaust path 110.

In a step 310, the gas turbine engine system 100 is operated using one or more fuels to produce, for example, torque or power. The operation of the gas turbine engine system 100 relies on an active flame within the combustor 104.

At a step 320, the control system 200 (e.g., including controller 210) determines whether fuel is flowing within the combustor 104. If the control system 200 determines that fuel is flowing within the combustor 104 at or above a certain proportion of the total fluid within the combustor 104, then at a step 330, the control system 200 may begin monitoring for a flameout condition. If the control system 200 determines that fuel is not flowing within the combustor 104, or that the amount of fuel flowing into the combustor 104 is below a certain proportion of the total fluid within the combustor 104, the control system 200 may continue to operate the gas turbine engine system 100 without monitoring for a flameout condition.

If, at a step 340, the control system 200 determines that a flameout condition has occurred, then at a step 350, the control system 200 may emit a signal to release the dilution gas from the containers 120. For example, the controller 210 may emit the first output 242 to open one or more release valves 122. As mentioned, release valves 122 may be solenoid valves. In some aspects, each of the one or more release valves 122 may be opened at the same time. The control system 200 may wait a calculated or predetermined amount of time to release the dilution gas from the containers 120. The amount of time the control system 200 may wait corresponds to the calculation using CFD of when the cloud 150 will reach the distance d along the exhaust path 110 for a given gas turbine engine system 100 when maximum fuel is flowing into the combustor 104 during a flameout condition. Once the cloud 150 has reached distance d, or the predicted time for the cloud 150 to reach distance d has elapsed after a flameout condition, the inert gas 124 within the storage container 120 may be released into the exhaust path 110 by opening one or more of the release valves 122.

After releasing the dilution gas at a step 350, then the control system 200 may activate the alarm 130 at a step 360. For example, the controller 210 may emit the second output 244 to provide notice of the flameout condition. In some aspects, the controller 210 may emit the second output to the alarm 130. Activating the alarm 130 at step 360 signals that a flameout condition has occurred. In some aspects, activating the alarm 130 may also indicate that the inert gas 124 (e.g., nitrogen gas) within the one or more storage containers 120 has been released. As mentioned, the alarm 130 may be a visual alarm, an audible alarm, a tactile alarm, etc.

At a step 370, the gas turbine engine system 100 may be restarted after replacing the storage container 120. For example, the controller 210 may emit the third output 246, including the restart command. The gas turbine engine system 100 may be reset or restarted automatically by the control system 200. Alternatively, an operator may input reset or restart commands into the control system 200, for example, via a user interface.

INDUSTRIAL APPLICABILITY

Various aspects of this disclosure may help to detect when a flameout condition occurs, for example, within the combustor 104 of the gas turbine engine system 100. Additionally, when the flameout condition occurs, various aspects of this disclosure may help to dilute the gas or fluids within the exhaust path 110. As mentioned, various aspects of this disclosure may detect the flameout condition, and may signal one or more storage containers 120 to release the stored gas or fluid (e.g., an inert gas like nitrogen gas) into the exhaust path 110. The released gas or fluid may help to dilute, disperse, mix with, or otherwise interact with the gas or fluid within the exhaust path 110. In these aspects, the released gas or fluid may reduce the concentration of hydrogen (e.g., $H_2$), oxygen (e.g., $O_2$), or other gas(es) or fluid(s) within the exhaust path 110 after a flameout condition occurs. Reducing the concentration of hydrogen, oxygen, or other gas(es) or fluid(s) within the exhaust path 110 after a flameout condition occurs may help to reduce the likelihood of an ignition, a deflagration, a detonation, etc. Furthermore, in some aspects, the release of the gas or fluid may be delayed for a period of time after the detection of the flameout condition, which may help to ensure that the gas or fluid is released at a time to most effectively dilute, disperse, mix with, or otherwise interact with the gas or fluid within the exhaust path 110 after the flameout condition has been detected.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method of diluting one or more exhaust gases of a gas turbine engine system including a compressor, a combustor, and a turbine, the method comprising:
    determining if fuel is flowing to the combustor for the gas turbine engine system;
    detecting a flameout condition within the combustor; and
    releasing a dilution gas from one or more storage containers downstream of the turbine as a function of the detected flameout condition after the fuel that has passed through the combustor after detecting the flameout condition reaches a distance downstream of the turbine, the distance being a function of a flow rate and/or velocity of the fuel.

2. The method of claim 1, wherein the dilution gas is released at a predetermined time delay after detecting the flameout condition, and wherein the dilution gas is nitrogen.

3. The method of claim 1, wherein each storage container has a release valve in communication with a controller, and wherein the controller is configured to open the release valve at a predetermined time after detecting the flameout condition.

4. The method of claim 1, wherein the gas turbine engine system further includes a sensor for detecting the flameout condition.

5. The method of claim 4, wherein the sensor is a pressure sensor.

6. The method of claim 4, wherein the gas turbine engine system further includes a generator, and wherein the sensor detects a reversal of current or power to the generator to determine the flameout condition.

7. The method of claim 1, wherein the method further includes:
    activating an alarm after the detection of the flameout condition; and
    restarting the gas turbine engine system after the detection of the flameout condition.

8. The method of claim 1, wherein the distance is determined using computational fluid dynamics.

9. A method of deploying a dilution gas into an exhaust of a gas turbine engine system including a compressor, a combustor, and a turbine, the method comprising:
    determining if fuel is flowing to the combustor for the gas turbine engine system;
    detecting a flameout condition within the combustor; and
    releasing a dilution gas from one or more storage containers downstream of the turbine a predetermined amount of time after detecting the flameout condition, the predetermined amount of time corresponding to a time needed for the exhaust to reach a distance along an exhaust path when maximum fuel is flowing into the combustor.

10. The method of claim 9, wherein the flameout condition is detected by a pressure sensor configured to measure a pressure of a discharge of the compressor.

11. The method of claim 9, wherein the gas turbine engine system further comprises a generator and an output shaft, and wherein the flameout condition is determined by sensing a reversal of current or power to the generator.

12. The method of claim 9, wherein the predetermined amount of time after detecting the flameout condition is calculated as a function of a flow rate and/or velocity of the fuel and is determined using computational fluid dynamics.

13. The method of claim 9, wherein the method further includes:
   activating an alarm after the detection of the flameout condition; and
   restarting the gas turbine engine system after the detection of the flameout condition.

14. The method of claim 9, wherein the dilution gas is nitrogen gas.

15. A gas turbine engine system for combusting fuel, the gas turbine engine system comprising:
   a compressor;
   a combustor downstream of the compressor for igniting the fuel and producing a flame;
   a turbine downstream of the combustor;
   an exhaust path downstream of the turbine;
   a sensor for detecting whether the flame within the combustor has been extinguished;
   a container of an inert gas, wherein the container is coupled to the exhaust path via a release valve; and
   a controller in communication with the sensor and the release valve, wherein the controller is configured to open the release valve after detecting that the flame within the combustor has been extinguished,
   wherein the container is located at a distance along the exhaust path away from the turbine, wherein the distance is a function of a flow rate and/or velocity of the fuel and is determined using computational fluid dynamics.

16. The gas turbine engine system of claim 15, wherein the sensor is a pressure sensor configured to detect when the flame within the combustor has been extinguished by measuring a pressure of a discharge of the compressor.

17. The gas turbine engine system of claim 15, wherein the gas turbine engine system further comprises a generator, and the sensor is configured to detect when the flame within the combustor has been extinguished by sensing a reversal in current or power to the generator.

18. The gas turbine engine system of claim 15, wherein the inert gas is nitrogen.

19. The gas turbine engine system of claim 15, wherein the gas turbine engine system comprises a plurality of containers of the inert gas, wherein each container of the plurality of containers is coupled to the exhaust path via a respective release valve.

20. The gas turbine engine system of claim 15, wherein the controller is configured to open the release valve at a predetermined time after detecting the flame within the combustor has been extinguished.

* * * * *